United States Patent Office 3,738,948
Patented June 12, 1973

3,738,948
RUBBER COMPOSITIONS
Donald D. Dunnom, Pittsburgh, Pa., assignor to PPG Industries, Inc., Pittsburgh, Pa.
No Drawing. Filed Dec. 21, 1970, Ser. No. 100,425
Int. Cl. C08d 9/10; C08g 37/10
U.S. Cl. 260—3
23 Claims

ABSTRACT OF THE DISCLOSURE

Fiber reinforced rubber compositions and particularily vehicular tires employing a vulcanization product comprising a finely-divided reinforcing siliceous filler, a methylene donor compound such as hexamethylene tetramine, a multifunctional phenol such as resorcinol and a compatible metal soap such as calcium stearate; and a novel process of preparation are provided.

This invention relates to novel rubber compositions (alternatively referred to herein as elastomers and vulcanizates) and to vehicular tires made therefrom and more particularly to rubber compositions comprising a rubber, a reinforcing fiber, a finely-divided siliceous reinforcing filler, a methylene donor compound, a multifunctional phenol (i.e., having more than one hydroxyl group), and a metal soap; and to a novel process for preparing these vulcanized rubber compositions.

BACKGROUND OF THE INVENTION

It is known that fiber reinforcement such as textile mats can be made to adhere to rubber compositions and particularly rubber tires by the use of an adhesive mixture comprising a finely-divided precipitated siliceous filler, a methylene donor compound and a polyfunctional phenol. One of the difficulties encountered with this adhesive mixture, however, is that upon vulcanization or heat aging the hexamethylene compound degrades to form reaction products which are deleterious to the textile. More particularly, the degradation products of the methylene donor compound attack the fibers and particularly polyester fibers to reduce or materially reduce their adhesion to the rubber.

It has now been discovered, however, that these problems can be materially reduced and an improved rubber-fiber reinforced composition obtained by incorporating into the rubber matrix a metal soap. Moreover, it has been discovered that even further improved results can be obtained by incorporating the ingredients in a particular manner.

The rubbers (alternatively referred to herein as elastomers which materials are unvulcanized) which can be employed in the invention include both natural and synthetic rubbers. Exemplary of suitable synthetic rubbers are styrene-butadiene, butyl rubber, nitrile rubber, polybutadiene, polyisoprene, ethylene-propylene, acrylic, fluorocarbon rubbers, polysulfide rubbers, and silicone rubbers. Mixtures or copolymers of the above synthetic rubbers can be employed alone or in combination with natural rubber. The preferred rubbers are nitrile rubber, styrene-butadiene rubber, natural rubber, polyisoprene, and mixtures because they are most compatible with polyester fibers although minor amounts of other rubbers can be included without adverse effects.

In addition to the polyester reinforcement fibers which heretofore have been most difficult to bond to rubber, there can be employed: artificial fibers made from mineral matter such as spun glass and metallic threads, man-made synthetic fibers such as nylon and rayon, vegetable fibers such as cotton, and mixtures. The fibers are preferably surface treated to form an adhesive coating such as with an epoxy or resorcinol-formaldehyde resin, and the like.

The compositions of the invention are particularly useful for the polyester fibers alone or in combination with wire such as, for example, steel or brass coated wire (e.g., 70 percent copper, 30 percent zinc).

Siliceous fillers (alternatively referred to herein as siliceous or silica-reinforcing fillers, pigments, or fillers) useful in the invention are the finely-divided, precipitated silica, sometimes accompanied by an insoluble silicate, having little development of gel characteristics. These materials can be prepared by reaction of alkali metal silicate with acids. These silicas generally contain at least 50 percent by weight, and preferably at least 80 percent $SiO_2$ measured on the anhydrous basis (excluding bound and free water) and have a BET surface area (as measured using nitrogen gas) of between about 50 and about 600 square meters per gram, and preferably between about 70 and about 300 square meters per gram, and an average ultimate particle size between about 50 and about 10,000 angstroms, preferably between about 50 and about 400, and more preferably between 150 and 300 angstroms. The BET method of measuring surface area is described in the Journal of the American Chemical Society, vol. 60, page 304 (1930). Suitable silica and a method of preparation are disclosed in U.S. Pats. 2,805,955, issued Sept. 10, 1957 to Edward M. Allen, and 2,940,830, issued June 14, 1960 to Fred S. Thornhill.

The multifunctional phenol can be resorcinol or phloroglucinol. Resorcinol, however, is preferred.

Various methylene donors can be employed in the present invention such as hexamethylene tetramine, hexamethoxy methyl melamine, paraformaldehyde, butyraldehyde and Cohedur A (a viscous liquid which liberates formaldehyde on heating, manufactured by Farbenfabriken Bayer A.G.). The preferred methylene donors are hexamethylene tetramine, hexamethoxy melamine and Cohedur A. Hexamethylene tetramine is most preferred because it is inexpensive and can be employed in very minor amounts with the metal soap.

The metal soaps which can be employed in the invention are high melting metal soaps, generally having melting points between about 100 to 200° C. The metal soaps which can be employed are those formed from a fatty acid having from 12 to 20 carbon atoms and a metal or metal oxide (hereinafter for convenience principally referred to only as the metal) which is compatible with the rubber formulation. The fatty acid can be composed of both saturated and unsaturated acids such as stearic, palmitic, oleic, lauric, and myrstic acids but preferably is formed from stearic, palmitic, oleic, or mixtures. The compatible metals which can be employed include: an alkali metal, such as lithium; an alkaline earth metal, such as magnesium, calcium, barium, and strontium; a Group II-B metal such as cadmium; a Group III metal such as aluminum; a group IV-A metal such as tin; and a Group IV-B metal such as titanium or zirconium; or their oxides. Metal soaps can be employed prepared from other metals but generally these other metals are toxic to humans, i.e., radioactive; deleterious to the rubber formulation or prohibitively expensive. Metal soaps which should not be employed are those formed from metals such as potassium and sodium because they are water-soluble and have deleterious effects upon most rubber compositions upon aging. The preferred metals are the polyvalent metals and more preferably the bivalent metals such as the alkaline earth metals. Trivalent metals such as aluminum, however, show good effects upon aging and even a monovalent metal such as lithium is efficacious. The most effective metals are barium, calcium, and aluminum. The reason that the metal soaps formed from polyvalent metals are generally superior is believed to be that the multivalent metals react more strongly with the silica pigment than monovalent metals. Only a minor amount of metal soap need be employed such as from about 0.5 to 10 parts per hundred (p.p.h.) parts of rubber, and preferably from about 0.5 to about 4 p.p.h. Depending upon the particular rubber, effectiveness of the soap and other ingredients present in the formulation, amounts of up to about 20 p.p.h. may sometimes be employed. The metal soaps can be prepared in situ but preferably are prepared prior to the addition to the rubber formulation for better dispersion.

The conventional accelerators and antioxidants can be employed in the rubber compositions of the invention (alternatively referred to herein as vulcanizates) among which are: 1,3-diphenylguanidine (DPG), 2-mercaptobenzothiazole (MBT), 2,2' - dithiobis(benzothiazole) (MBTS), bis(dimethylthiocarbamoyl) disulfide (TMTD), N-cyclohexyl-2-benzothiazolesulfenamide (CHBS), zinc dimethyldithiocarbamate (ZnDMDC), and n-phenyl-2-naphthylamine (PBNA). The preferred accelerator is 2,2'-dithiobis(benzothiazole) and the preferred antioxidant is Octamine, a reaction product of diphenylamine and diisobutylene. Other conventional rubber ingredients can be employed such as the so-called "activators" preferably a combination of stearic acid and zinc oxide which are often used with organic accelerators to increase their efficiency. Other activators include litharge, zinc oxide, red and white lead, magnesium oxide and lime.

Vulcanizing agents are preferably employed such as elemental sulfur, tetramethylthiuram disulfide, selenium and tellurium (preferably with sulfur) and aromatic nitrogen containing compounds such as dioximes, diisocyanates, and dinitroso compounds. Other conventional rubber chemicals, such as reinforcing fillers (i.e., carbon blacks), waxes, blowing agents, plasticizers, retarders and other conventional rubber chemicals can be employed which are described in Kirk-Othmer, Encyclopedia of Chemical Technology, volume 11, (1953), pp. 870-945 (published by the Interscience Encyclopedia, Inc., New York). The elastomers of the invention can contain between 10 and 200 parts by weight of silica, preferably between 40 and 80 parts by weight of silica per 100 parts of rubber. The antioxidants and accelerators will generally be employed in amounts between about 0.5 and 2 parts per 100 parts of rubber. The sulfur vulcanizing agent between about 0.5 part and 3 parts per 100 parts of rubber, the multifunctional phenol between about 0.5 and 5 phr. (parts per hundred parts of rubber), the methylene donor between about 0.5 and 4.0 phr. and preferably between about 0.8 and 1.6 phr., carbon black between about 0 and about 180 phr., activator in an amount of about 0.5 to 10 phr. Although no carbon black filler need be employed, mixtures of the siliceous reinforcing filler and carbon black show equivalent results, it only being necessary that the total filler is at least about 20 to about 200 phr., and that the siliceous filler constitutes at least about 10 phr.

The reinforcing fiber can be in the form of cloth, mats, roping, strands, yarns, milled fibers and the like. Mats are generally made from approximately 2-inch strands in a random fiber pattern held together by a binder. Roving consists of long continuous strands and milled fibers are generally produced by hammer milling the longer fibers to screen sizes from 1/32 to 1 inch.

The reinforced rubber vulcanizates of the invention can be used to manufacture belts, hoses, and the like, but are particularly efficacious for treads and carcasses of vehicular tires.

The vulcanizates can be prepared in a number of ways but preferably the activator is incorporated into the rubber batch prior to the addition of vulcanizing agent and the resultant mixture vulcanized in intimate contact with the reinforcing fiber. For example, a rubber batch, the silica reinforcing filler (and carbon black reinforcing filler if employed), multifunctional phenol, metal soap, methylene donor, activator (e.g., zinc oxide and stearic acids), and accelerator and antioxidant are intimately mixed such as in a Banbury and the vulcanizing agent added to said batch in a subsequent mixing step, preferably on a mill. When the preferred mixing step is employed, a substantial increase in fiber adhesion to the rubber is obtained when the rubber is vulcanized or cured. The compositions can then be formed such as by calendering so that in the case of vehicular tires, the mixture can be formed to relatively thin sheets, coated on a reinforcing fabric and applied with a plurality of other plies to an extruded rubber tread and the composite vulcanized by conventional procedures as illustrated in the Vanderbilt Rubber Handbook, 9th ed. (1948), N.Y.

The following examples will serve to illustrate the invention and its preferred embodiments.

Examples 1 through 10 are illustrated in the following Table 1. The ingredients marked by asterisks were added on the mill to a rubber batch comprising the other ingredients. The rubber batch was mixed in a Banbury maintained at 155 r.p.m. with the water on full. Each composition was prepared by first incorporating the rubbers, fillers (e.g., one-half of the total carbon black and all of the silica), antioxidant, one-half of activator (e.g., metal oxide), and multifunctional phenol to which were added after one-half minute of mixing the remainder of the carbon black, remainder of activator (e.g., fatty acid), and metal soap. After one minute of additional mixing, the mixture was discharged and fur-

TABLE 1

| Example | Parts by weight | | | | | | | | | |
|---|---|---|---|---|---|---|---|---|---|---|
| | 1 | 2 | 3 | 4 | 5 | 6 | 7 | 8 | 9 | 10E |
| Rubber composition (ingredients): | | | | | | | | | | |
| SMR-H-5L (natural rubber) | 70 | 70 | 70 | 70 | 70 | 70 | 70 | 70 | 70 | 70 |
| SBR 1708 (styrene butadiene rubber) | 30 | 30 | 30 | 30 | 30 | 30 | 30 | 30 | 30 | 30 |
| SRF (N-770) (semi-reinforcing carbon black) | 30 | 30 | 30 | 30 | 30 | 30 | 30 | 30 | 30 | 30 |
| HI-SIL 210 [1] | 15 | 15 | 15 | 15 | 15 | 15 | 15 | 15 | 15 | 15 |
| Resorcinol | 2.5 | 5 | 2.5 | 2.5 | 2.5 | 2.5 | 2.5 | 2.5 | 2.5 | 2.5 |
| Zinc oxide | 5 | 5 | 5 | 5 | 5 | 5 | 5 | *5 | 5 | 5 |
| Aluminum stearate | | | | 1 | | | | | | |
| Calcium stearate | | | | | 1 | | | | | |
| Stearic acid | 2 | 2 | 2 | 2 | 2 | 2 | 2 | 2 | 2 | 2 |
| *Hexa Flo-Powder [2] | | 1.5 | 0.5 | 1.5 | 1.5 | | | 1.5 | 1.5 | 1.5 |
| *Cyrez 966 [3] | | | | | | 5 | | | | |
| *Cohedur A [4] | | | | | | | 2.5 | | | |
| *MBTS (benzathiazole disulfide) | | | | | | | | | | |
| *Santocure NS [5] | 1 | 1 | 1 | 1 | 1 | 1 | 1 | 1 | | |
| *NOBS Special [6] | | | | | | | | | 0.8 | |
| Octamine [7] | 1 | 1 | 1 | 1 | 1 | 1 | 1 | 1 | 1 | 0.8 |
| *Sulfur | 2.5 | 2.5 | 2.5 | 2.5 | 2.5 | 2.5 | 2.5 | 2.5 | 2.5 | 2.5 |

[1] Precipitated silica product having an ultimate particle size of 225 angstroms and a B.E.T. surface area of approximately 150 square meters per gram sold by PPG Industries, Inc.
[2] Product of Heyden Chemical for hexamethylene tetramine.
[3] Product of American Cyanamid for hexamethoxymethyl melamine.
[4] Product of Farbenfabriken Bayer AG for a viscous liquid which liberates formaldehyde on heating.
[5] Product of Monsanto Company for N-cyclohexyl-2-benzothiazole sulfenamide.
[6] Product of American Cyanamid Co. for N-oxydiethylene benzothiazole-2-sulfenamide.
[7] Product of U.S. Rubber for reaction product of diphenylamine and diisobutylene.

ther intimately mixed on a rubber mill with the other ingredients at a roll temperature of 120° F.

The compositions of Examples 1 through 10 were formed into a simulated tire carcass with a surface modified polyester tire cord (Celanese Corporation—Type 790) and cured for 40 minutes at 300° F. The compositions were than tested for adhesion by the Peel Adhesion Test (ASTM D 413–39, 1965) both before and after aging and the results are reported in the following Table 2. From the table, it can be seen that composition 5 containing a minor amount of metal soap has better adhesion properties than the other rubbers having equivalent amounts of ingredients and is nearly as good as compositions 6 and 7 which have more than three times as much methylene donor in the former case and nearly two times of a more effective methylene donor in the latter case.

TABLE 2

[Direct bonding rubber systems and polyester degration]

| | In rubber properties | |
|---|---|---|
| | Peel adhesion 1″ at 250° F. (lbs.) | Heat aged 12 hrs. at 300° F., peel adhesion 1″ at 250° F. (lbs.) |
| Rubber composition: | | |
| 1 (control) | 3 | 2 |
| 2 | 17 | 2 |
| 3 | 13 | 5 |
| 4 | 10 | 3 |
| 5 | 30 | 19 |
| 6 | 36 | 23 |
| 7 | 38 | 7 |
| 8 | 24 | 7 |
| 9 | 13 | 7 |
| 10 | 14 | 4 |

The following Examples 11 through 15 are given below along with the mixing and testing procedures and the results:

POLYESTER ADHESION AND DEGRADATION

| | Parts by weight | | | | |
|---|---|---|---|---|---|
| Example No | 11 | 12 | 13 | 14 | 15 |
| Ingredients: | | | | | |
| Natural rubber | 70 | 70 | 70 | 70 | 70 |
| SBR 1708 | 30 | 30 | 30 | 30 | 30 |
| Carbon Black SFR (N770) | 30 | 30 | 30 | 30 | 30 |
| Hi-Sil 210 | | 15 | 15 | | |
| Hi-Sil EP [1] | | | | 45 | 45 |
| Resorcinol | | 2.5 | 2.5 | 2.5 | 2.5 |
| Calcium stearate | | | 1 | | 1 |
| Stearic acid | 2 | 2 | 2 | 2 | 2 |
| Cyrez 966 | | 5 | 5 | 5 | 5 |
| MBTS | 1 | 1 | 1 | 1 | 1 |
| Octamine | 1 | 1 | 1 | 1 | 1 |
| *Sulfur | 2.5 | 2.5 | 2.5 | 2.5 | 2.5 |
| *Zinc oxide | 5 | 5 | 5 | 5 | [2]5 |

[1] Precipitated silica product having a surface area of 60 (B.E.T.) m.²/gm. sold by PPG Industries, Inc.
[2] Add Zno with Hi-Sil EP in Banbury.

NOTE.—
Banbury mixing: 155 r.p.m.; water on full. 0 min.—rubbers, ½ fillers, octamine, resorcinol. ½ min.—½ fillers, stearic acid, calcium stearate. 1½ min.—discharge.
Mill mix: 120° F. roll temp. (ingredients marked by (*) added on mill).
Testing: 1. Goodrich Disc. Fatigues samples (Celanese T-790 tire cord); 95% cure at 300° F. (10 of each composition required). 2. Goodrich Disc. Fatigue (ASTM D 623–67A). 3. Strip adhesion; 95% cure at 300° F. Celanese F 15 (T-790) polyester-square woven fabric (ASTM D 751).

| Example No | 11 | 12 | 13 | 14 | 15 |
|---|---|---|---|---|---|
| Adhesion to square woven fabric, lbs./in. (cure 30′ at 300° F.) | 2.2 | 23.0 | 30.8 | 15.8 | 50.0 |
| Goodrich dynamic fatigue cord adhesion (pounds/0.5″) | | | | | |
| Hours flexed: | | | | | |
| 0 | 5.7 | 13.4 | 19.3 | 15.5 | 22.2 |
| 25 | 1.4 | 10.2 | 11.0 | 9.8 | 17.0 |
| 50 | 1.0 | 8.9 | 8.2 | 5.4 | 11.9 |
| 100 | 0.8 | 9.0 | 9.6 | 5.5 | 11.7 |

From the results, it can be seen that the silica filled composition No. 15 containing a minor amount of calcium stearate metal soap is more than three times as effective by the static test and more than twice as effective by the dynamic test after 100 hours of flexing than silica filled composition No. 14 having no calcium stearate. Although the magnitude of superiority is not as great over compositions Nos. 12 and 13 which contain a large proportion of carbon black filler, the superiority of composition No. 15 is still manifest. The superiority of composition No. 15 over composition No. 11 which contains no methylene donor, multifunctional phenol, silica pigment, or metal soap, is quite striking. Moreover, the efficacy of incorporating the activator (e.g., zinc oxide and stearic acid) in the rubber batch prior to the addition of vulcanizing agent is illustrated by the superiority of composition No. 15.

The wire adhesion is illustrated by Examples 17 through 24 which are given below along with the method of preparation and testing procedure.

WIRE ADHESION

| | Parts by weight | | | | | | | |
|---|---|---|---|---|---|---|---|---|
| Example No | 17 | 18 | 19 | 20 | 21 | 22 | 23 | 24 |
| Ingredients: | | | | | | | | |
| Natural rubber | 100 | 100 | 100 | 100 | 100 | 100 | 100 | 100 |
| Carbon Black FEF (N550) | 30 | 30 | 30 | 30 | 30 | 30 | 30 | 30 |
| HI-Sil 210 | 15 | 15 | 15 | 15 | 15 | 15 | 15 | 15 |
| X R-124 MB [1] | | | | 4.2 | 4.2 | 4.2 | 4.2 | 4.2 |
| *Hexa Flo-Powder | | | | 1.5 | 1.5 | | 1.5 | 1.5 |
| *Cyrez 966 | | | | | 5 | | | |
| *Cohedur A | | | | | | 2.5 | | |
| Calcium stearate | | | | | | 1 | | |
| Stearic acid | | 3 | 3 | 3 | 3 | 3 | 3 | 3 |
| Zinc oxide | | 5 | 5 | 5 | 5 | 5 | 5 | 5 |
| *Sulfur | 3.5 | 3.5 | 3.5 | 3.5 | 3.5 | 3.5 | 3.5 | 3.5 |
| *Santocure NS | 1 | 1 | 1 | 1 | 1 | 1 | | |
| *MBTS | | | | | | | 0.8 | |
| *NOBS Special | | | | | | | | 1 |

[1] Co-melt of equal amounts of resorcinol and stearic acid.

NOTE.—
Banbury mix: 155 r.p.m.; water on full; 0 min.—rubber, black, Hi-Sil,XR-124, calcium stearate, stearic acid, zinc oxide; discharge—1½ min. after power peak or 325° F.
Mill mix: 120° F. roll temp. (ingredients marked by *).
Testing: 1. Brass tire cord adhesion: 90%, 95%, 100% cure at 300° F. (D–1871-68 ASTM).

When the results are plotted on a graph, it can be seen that the adhesion-cure line for composition 22 containing only 1 part of metal soap and 1.5 parts of Hexa Flo-Powder is nearly equivalent to composition 21 which contains 2.5 parts of Cohedur A. Thus, by the invention relatively inexpensive metal soaps such as calcium stearate can be employed with methylene donors which are also relatively inexpensive such as Hexa Flo-Powder and Cyrez 966 to achieve adhesion nearly equivalent to the more efficient but also more expensive methylene donors such as Cohedur A. When, however, Cohedur A is employed as the methylene donor in accordance with the compositions of the invention even more improved results can be achieved. In addition, the composition of the invention, Example 22, exhibited a better adhesion and more rapid curve than composition 20 which contains 5 parts of methylene donor as compared to composition 22 which contains only 1.5 parts of methylene donor and 1 part of metal soap. Compositions 23 and 24 containing no metal soap and each having a different accelerator exhibit a low curve in the former case and a rapid decreasing curve in the latter case. Composition 19 which contains no metal oxide or metal soap shows a relatively flat curve. Composition 18 which contains no multifunctional phenol or methylene donor also shows a flat curve. Composition 17 which contains neither methylene donor, multifunctional phenol, metal soap, or fatty acid shows an early increasing curve but which rapidly flattens out after a few minutes of curing.

The general procedure employed with Examples 11 through 15 was repeated employing stoichiometric equivalent amounts of metal soaps (i.e., equivalent to part of calcium stearate) formed from stearic acid and the metals—lithium, magnesium, cadmium, aluminum, barium and tin. All soaps were effective with barium stearate showing the best adhesion after 15 minutes of curing at 300° F., followed closely by calcium stearate and a soap of middle effectiveness, namely, tin stearate; and a somewhat less effective group comprising aluminum stearate, magnesium stearate, lithium stearate, and cadmium stearate in decreasing order of activity. The aluminum-containing composition, however, was unusual in that the adhesion did not decrease with increasing cure and thus after 60 minutes of cure the adhesion was substantially the same. With all of the other metal soaps, there was a decrease in adhesion upon increased cure. Although the examples of the invention are illustrated by the use of metal stearates, metal soaps can be employed prepared from the other acids mentioned herein.

Although the invention has been described with reference to the specific details of particular embodiments, it is not intended thereby to limit the scope of the invention except insofar as the specific details are recited in the appended claims.

I claim:

1. Vulcanizable rubber compositions comprising a rubber selected from natural rubber, styrene-butadiene, butyl rubber, nitrile rubber, polybutadiene, polyisoprene, ethylene-propylene, acrylic, fluorocarbon rubbers, polysulfide rubbers, silicone rubbers, mixtures and copolymers, a reinforcing fiber, from between about 10 and about 200 phr. of a finely-divided siliceous filler, of at least about 0.5 phr. of an aldehyde or amine aldehyde condensate methylene donor compound, of at least about 0.5 phr. of a multifunctional phenol of resorcinol or phloroglucinol and between about 0.5 and about 10 phr. of a compatible high-melting metal soap formed from a fatty acid having from 12 to 20 carbon atoms and a compatible metal selected from magnesium, calcium, strontium, and barium, and/or their oxides.

2. The composition of claim 1 wherein the fatty acid is stearic acid.

3. The composition of claim 1 wherein the metal soap is calcium stearate.

4. The composition of claim 1 wherein the metal soap is barium stearate.

5. The composition of claim 1 wherein the rubber is a mixture of styrene-butadiene rubber and natural rubber.

6. The composition of claim 1 wherein the methylene donor compound is hexamethylene tetramine.

7. The composition of claim 1 wherein the multifunctional phenol is resorcinol.

8. The composition of claim 1 wherein the reinforcing fiber is a surface-modified polyester fiber.

9. The composition of claim 1 additionally comprising a reinforcing wire.

10. The composition of claim 9 wherein the reinforcing wire is an alloy of zinc and copper.

11. The composition of claim 1 wherein the rubber is selected from nitrile rubber, styrene-butadiene rubber, natural rubber, polyisoprene, and mixtures.

12. A vehicular tire formed from a vulcanized rubber composition comprising the reaction product of a rubber, selected from natural rubber, styrene-butadiene, butyl rubber, nitrile rubber, polybutadiene, polyisoprene, ethylene-propylene, acrylic, fluorocarbon rubbers, polysulfide rubbers, silicone rubbers, mixtures and copolymers, a reinforcing fiber, from between about 10 and about 200 phr. of a finely-divided siliceous filler, from between about 0.5 to 4.0 phr. of a methylene donor compound of hexamethylene tetramine, hexamethoxymethylmelamine, paraformaldehyde or butyraldehyde, a multifunctional phenol of resorcinol, phloroglucinol or low molecular weight resorcinol-formaldehyde resins in an amount from between about 0.5 and 5 phr. and from 0.5 to 10 phr. of a compatible high-melting metal soap formed from a fatty acid having from 12 to 20 carbon atoms and a compatible metal selected from magnesium, calcium, strontium, and barium, or their oxides.

13. The tire of claim 12 wherein the fatty acid is stearic acid.

14. The tire of claim 12 wherein the metal soap is calcium stearate.

15. The tire of claim 12 wherein the metal soap is barium stearate.

16. The tire of claim 12 wherein the rubber is a mixture of styrene-butadiene rubber and natural rubber.

17. The tire of claim 12 wherein the methylene donor compound is hexamethylene tetramine.

18. The tire of claim 12 wherein the multifunctional phenol is resorcinol.

19. The tire of claim 12 wherein the reinforcing fiber is a surface-modified polyester fiber.

20. The tire of claim 12 additionally comprising a reinforcing wire.

21. The tire of claim 12 wherein the reinforcing wire is an alloy of zinc and copper.

22. The tire of claim 12 wherein the rubber is selected from nitrile rubber, styrene-butadiene rubber, natural rubber, polyisoprene, and mixtures.

23. A process for preparing an improved fiber-reinforced rubber composition comprising forming an intimate rubber batch mixture of a rubber selected from natural rubber, styrene-butadiene, butyl rubber, nitrile rubber, polybutadiene, polyisoprene, ethylene-propylene, acrylic, fluorocarbon rubbers, polysulfide rubbers, silicone rubbers, mixtures and copolymers, a reinforcing fiber, from between about 10 and about 200 phr. of a finely-divided siliceous filler, from between about 0.8 and 1.6 phr. of a methylene donor compound of hexamethylene tetramine, hexamethoxymethylmelamine, paraformaldehyde or butyraldehyde, from between about 0.5 and 5 phr. of a multifunctional phenol of resorcinol, phloroglucinol or low molecular weight resorcinol-formaldehyde resins, and from about 0.5 to about 4 phr. of a compatible metal soap formed from a fatty acid having from 12 to 20 carbon atoms and a compatible metal selected from magnesium, calcium, strontium, and barium, or their oxides, an activator, an accelerator, and antioxidant; intermixing therewith a vulcanizing agent and vulcanizing the resultant product in intimate contact with a reinforcing fiber.

References Cited

UNITED STATES PATENTS

| 3,366,583 | 1/1968 | Wilson | 260—3 |
| 3,507,689 | 4/1970 | Freytag et al. | 260—3 |
| 3,517,722 | 6/1970 | Endter et al. | 260—845 |

FOREIGN PATENTS

| 1,483,340 | 6/1967 | France | 260—3 |

OTHER REFERENCES

Shchichko et al., "Soviet Rubber Technology" No. 1, vol. 25, January 1966, pp. 18–21.

C & E News, New Adhesives System Saves Time and Money, Apr. 22, 1968, pp. 40–41.

JOHN C. BLEUTGE, Primary Examiner

U.S. Cl. X.R.

152—330; 260—5, 17.2, 23 M, 33.6 AQ, 38, 41.5, 826, 831, 845, 846, 848